United States Patent [19]

Knaack et al.

[11] Patent Number: 4,509,787
[45] Date of Patent: Apr. 9, 1985

[54] TRUCK RACK

[75] Inventors: Howard L. Knaack; Kenneth F. Weger, Jr., both of Cary, Ill.

[73] Assignee: Knaack Manufacturing Company, Crystal Lake, Ill.

[21] Appl. No.: 363,107

[22] Filed: Mar. 29, 1982

[51] Int. Cl.³ .............................................. B60D 3/00
[52] U.S. Cl. ....................................... 296/3; 211/182; 224/325
[58] Field of Search ...................... 296/3, 10; 224/309, 224/325; 211/182

[56] References Cited

U.S. PATENT DOCUMENTS

| | | | |
|---|---|---|---|
| 3,224,805 | 12/1965 | Clyatt | 244/309 |
| 3,679,067 | 7/1972 | Konstant | 211/182 |
| 3,763,793 | 10/1973 | Fleck | 211/182 |
| 3,955,845 | 5/1976 | Werner | 296/10 |
| 4,057,281 | 11/1977 | Garrett | 296/3 |
| 4,211,448 | 7/1980 | Weston | 296/3 |
| 4,288,937 | 9/1981 | Virsen | 211/182 |

Primary Examiner—Bruce H. Stoner, Jr.
Assistant Examiner—John A. Carroll
Attorney, Agent, or Firm—Wood, Dalton, Phillips, Mason, & Rowe

[57] ABSTRACT

A rack for use with a truck having a body. The rack includes upright legs each having a lower end constructed to be mounted to the truck body to define longitudinally spaced pairs of upright legs at transversely opposite sides of the truck. Each leg has an upper end portion. A pair of elongated side members is provided, one side member being clamped to the legs at one side of the truck and the other side member being clamped to the legs at the other side of the truck at longitudinally spaced portions of the side members. Transverse rack members are provided having ends carried on the upper ends of the upright legs. The ends of the transverse members are received in sockets secured to the upper leg ends. A portion of the clamp structure is fixed to the upper leg ends.

5 Claims, 7 Drawing Figures

TRUCK RACK

BACKGROUND OF THE INVENTION

1. Field of the Invention

This invention relates to racks and in particular to racks adapted to be mounted on trucks such as for supporting ladders and the like.

2. Description of the Background Art

For carrying ladders and the like with a pickup truck, it is desirable to provide a rack which will permit extension of the ladders over the cab so as to minimize extension thereof beyond the rear of the truck.

It has been conventional to provide such racks to be bolted to the body side panels or to the floor of the truck bed, as desired. A problem arises in the prior art rack assemblies in that because of the wide range of truck body dimensions, a wide range of custom-designed racks has been required. Further, tolerances in the location of the sockets or mounting members have resulted in difficulty at times in fitting the rack to the truck bed, particularly where the rack is removably installed.

SUMMARY OF THE INVENTION

The present invention comprehends an improved rack structure for use with pickup trucks and the like.

The rack includes a plurality of upright legs having lower ends adapted to be received in the sockets carried on the truck body. The upper end of the legs define horizontal channels for receiving elongated side members of the rack structure.

Clamp means are provided for fixedly clamping the side members to the upper ends of the legs in the channels at positions determined by the spacing of the legs on the truck body.

In one form, the clamping means comprises clamp plates mounted on the opposite ends of transverse rack members, whereby the rack structure is defined by a box frame arrangement at the top of the legs.

The side members may extend forwardly of the forward pair of upright legs.

The rear transverse rack member may be removably mounted for facilitated movement of large objects to and from the truck bed at the rear thereof.

In the illustrated embodiment, the side members comprise tubular members having a flat surface spaced outwardly of the channel for clamping engagement by the clamp plates.

The ends of the transverse rack members are received in suitable sockets to be supported on the upper ends of the legs providing improved strength in the support of items carried on the transverse rack members.

Thus, the improved rack structure of the present invention is advantageously adapted for use with a wide range of lengths of truck bodies while yet providing a positive, sturdy rack support for ladders and the like.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
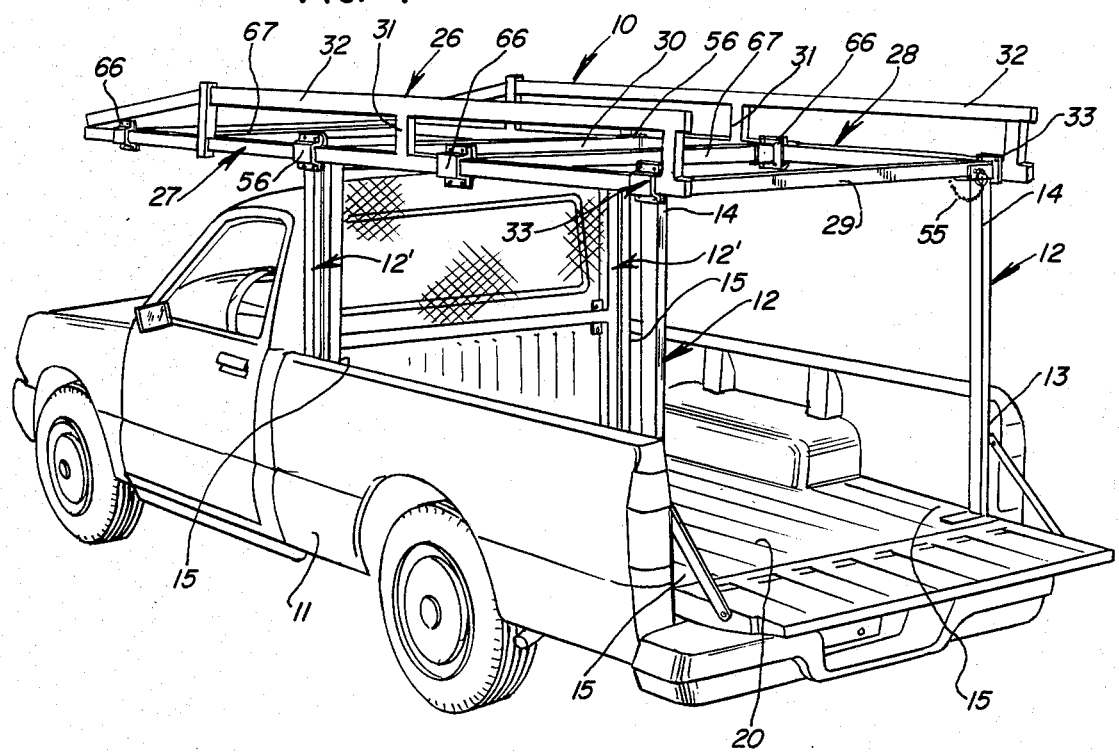
FIG. 1 is a perspective view illustrating a rack structure embodying the invention mounted to the floor of the truck body.

In the illustrative embodiment of the invention as disclosed in the drawing, an improved rack structure generally designated 10 is shown for use with a pickup truck 11. The rack structure includes a plurality of upright legs 12, each having a lower end portion 13 and an upper end portion 14.

In the embodiment of FIG. 1, the lower end portions 13 of the respective legs 12 nest in the four corners 15 of the truck bed. Rack structure 10 is advantageously adapted for use with many pickup trucks, providing a strong and rigid mounting of the rack structure thereto.

Figure 2:
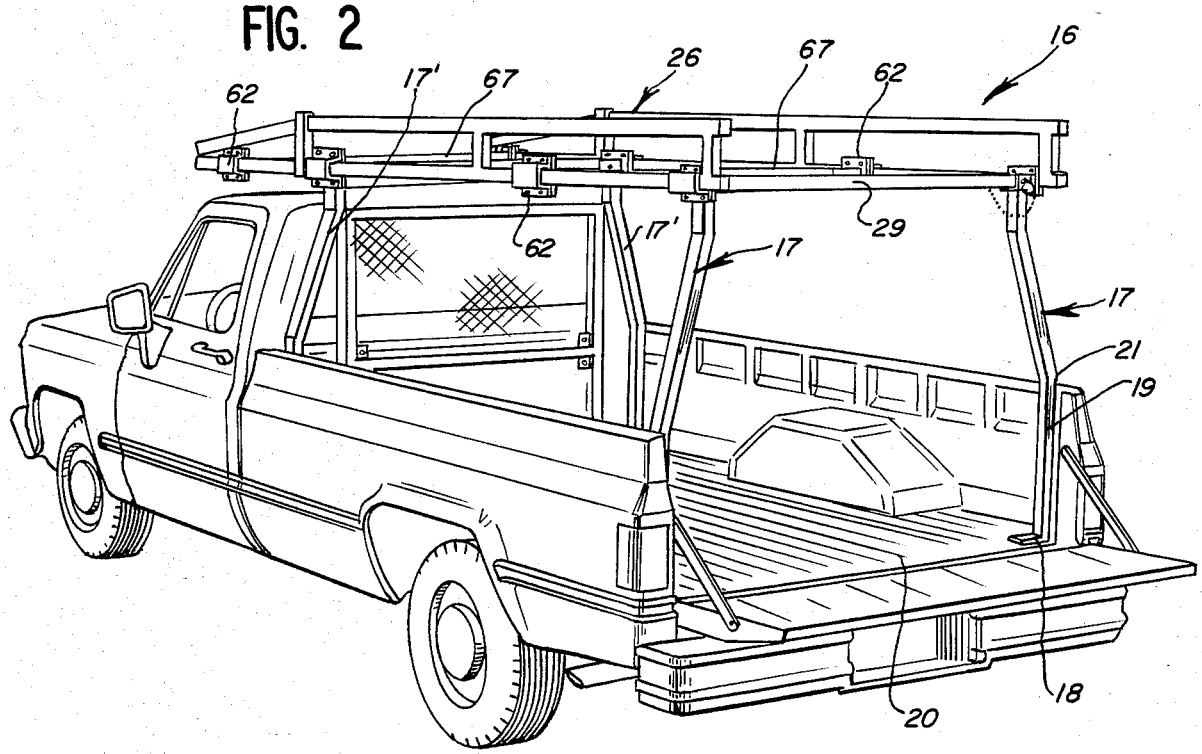
FIG. 2 is a perspective view of a modified form of rack embodying the invention comprising a floor-mounted rack.

A modified form of rack structure generally designated 16 is illustrated in FIG. 2. As shown therein, the support legs 17 are provided with floor plates 18 adapted to mount the lower ends 19 of the upright legs to the bed 20 of the truck. As shown in FIG. 2, the legs may include angled midportions 21 which generally conform to the truck side contours.

In each of the different forms of the rack structure discussed above, the rack further defines an upper frame portion generally designated 26. As shown, the frame portion may be similar in each of the different rack structures 10 and 16.

Figure 3:
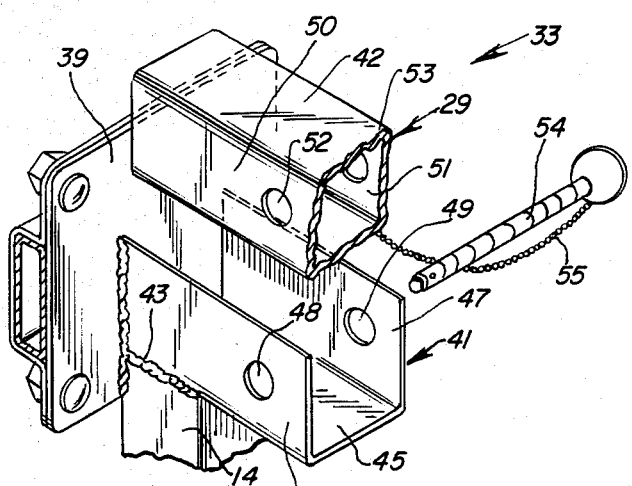
FIG. 3 is a fragmentary perspective exploded view illustrating the left rear connection of the transverse rack member to the left rear leg and left side member.

More specifically, each of the frame structures is defined by a pair of elongated side members 27 and 28. The frame further includes a pair of transverse members 29 and 30, which cooperate with the side members in forming a box frame configuration. As shown in FIG. 3, the side members may include upright portions 31 and a top elongated member 32.

Figure 4:
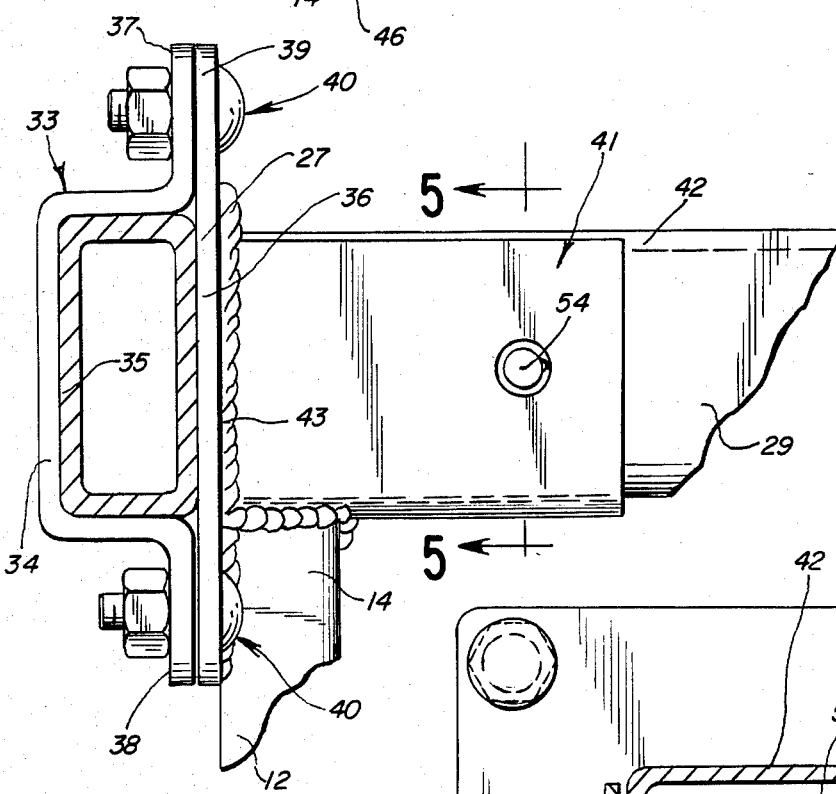
FIG. 4 is a fragmentary enlarged transverse section thereof.

The frame portion 26 is secured to the upper ends of the legs by retainers generally designated 33 each having a U-shaped bracket member 34 defining a horizontally opening channel 35. As seen in FIG. 4, the longitudinal rack member, such as rack member 27, is received in the channel 35 and defines an inner surface 36 which is spaced outwardly of the channel a small distance.

The U-shaped members define outturned flanges 37 and 38. A clamping plate 39 is clamped to the flanges by suitable securing means, such as nuts and bolts, 40. Thus, clamping plate 39 facially engages side member surface 36 and effectively clamps the side member in the channel 35, firmly retaining the side member.

Clamping plate 39 is provided with a U-shaped socket 41, as best seen in FIG. 3. The socket opens upwardly and is butted into the clamping plate for receiving the end 42 of the rear transverse member 29. The end of the socket is butt-welded to the clamping plate and to the upper end 14 of the leg 12 by suitable weld 43. Weld 43 may further extend downwardly to weld the upper end 14 of the leg to the clamping plate. As shown, the distal end of the socket member rests on the upper end 14 of the leg so as to provide a strong support for the transverse member 29.

Figure 5:
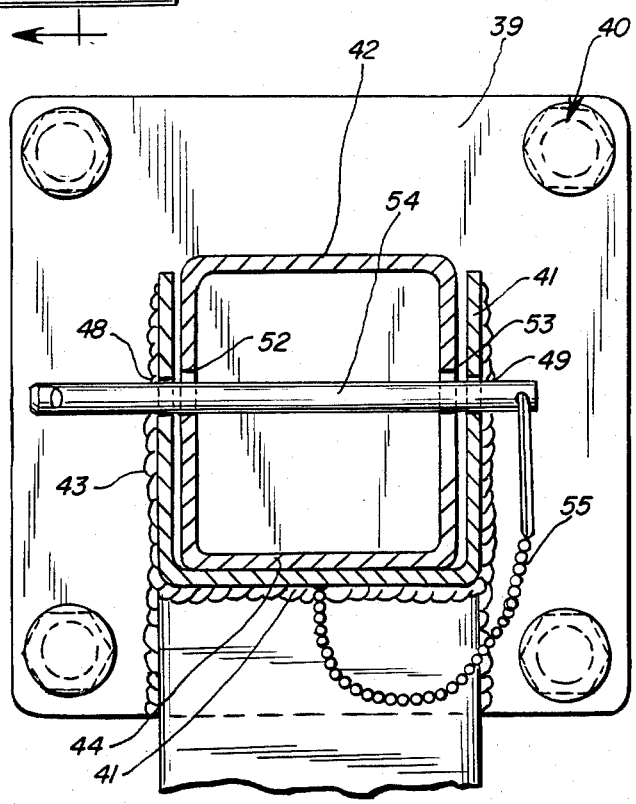
FIG. 5 is a cross section taken substantially along the line 5—5 of FIG. 4.

As best seen in FIG. 5, the transverse member end portion 42 nests within the socket 41, with the bottom wall 44 of end portion 42 resting on the bottom wall 45 of the socket which, in turn, rests on the upper end 14 of the support leg. The upright legs 46 and 47 of the socket are provided with aligned openings 48 and 49, respectively, and the sidewalls 50 and 51 of the transverse member end portion 42 are provided with aligned openings 52 and 53, respectively, arranged to be in aligned relationship with socket openings 48 and 49 in the nested relationship, as shown in FIG. 5.

A removable locking pin 54 is passed through the aligned openings so as to lock the end of the transverse member in the socket. The pin may be provided with a connecting chain 55 movably connecting the pin to the socket to prevent loss thereof in use.

The selectively releasable connecting structure 33 permits the end 42 of the rear transverse rack member 29 to be removably locked in supported relationship with the rear support leg. The connecting structure at the righthand end of the rear transverse rack member is reversely similar and, thus, the entire rear transverse member 29 may be removed from the rack assembly when desired, such as for moving large objects to and from the truck bed 20.

Figure 6:
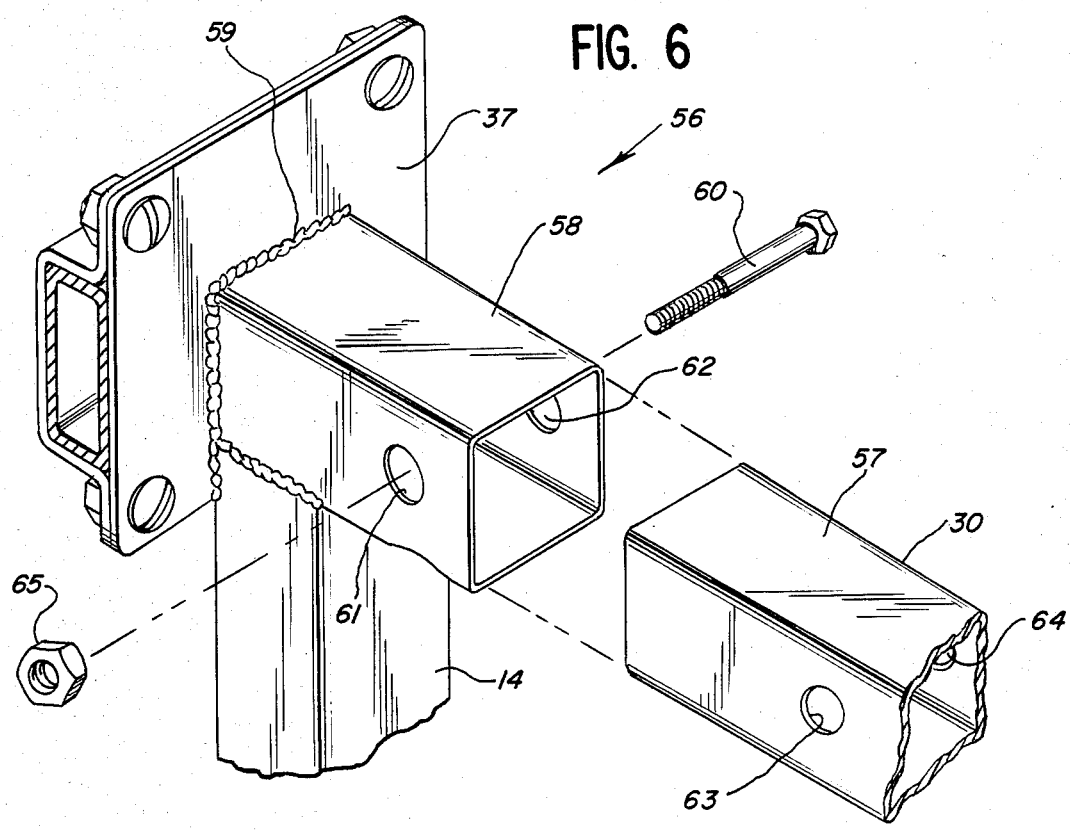
FIG. 6 is a fragmentary exploded perspective view illustrating the connection of the forward transverse rack member to the forward leg and left side member.

The forward transverse rack member 30 is normally retained in position in the rack assembly. Thus, as seen in FIG. 6, the connecting structure 56 for receiving the end 57 of the forward transverse rack member 30 is similar to connecting structure 33 but is provided with a tubular socket member 58 in lieu of the U-shaped socket member 41 of connecting structure 33. The tubular socket member is welded by suitable weld 59 to the mounting plate 39 and upper end of the support leg so as to support the tubular socket on the leg in the manner similar to the support of the U-shaped socket on the leg in the connecting structure 33.

As further illustrated in FIG. 6, a threaded bolt 60 may be extended through the aligned openings 61, 62, 63 and 64 in the socket and transverse member end portions, respectively. A suitable nut 65 may be provided for cooperation with the tie bolt 60 in locking the transverse member ends 57 to the connecting structure 56.

Figure 7:
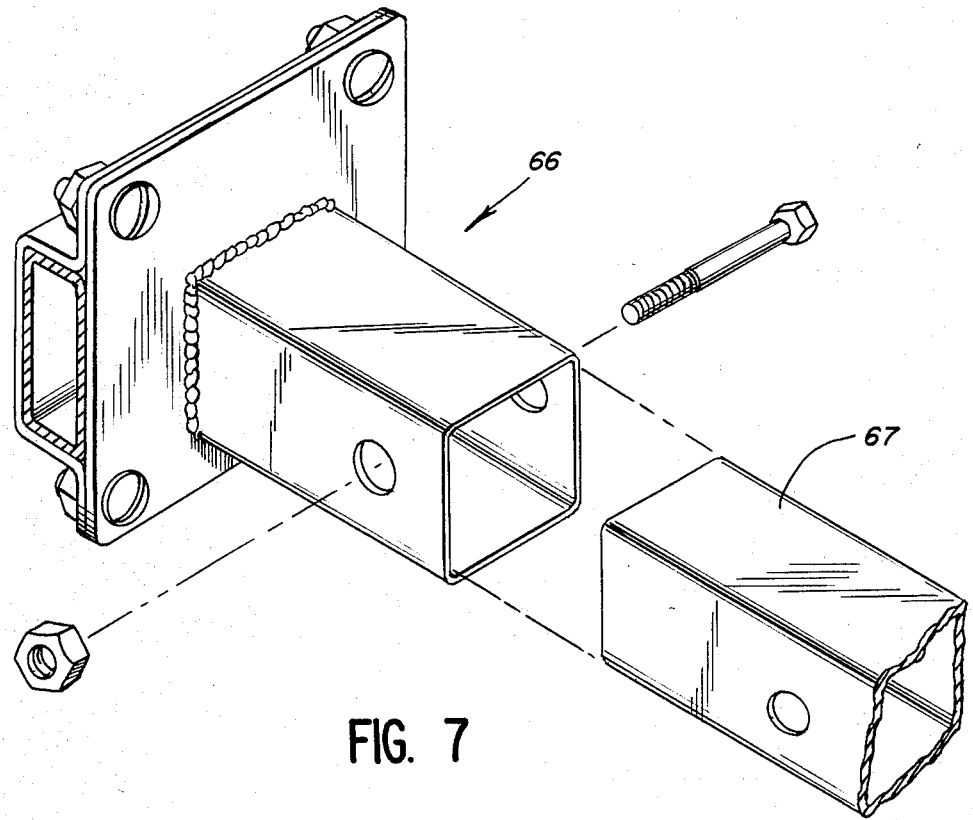
FIG. 7 is a view similar to that of FIG. 6 but illustrating a further modified form of connecting structure for use in providing additional transverse members spaced from the upright legs.

Referring now to FIG. 7, a further modified form of connecting structure generally designated 66 is provided for connecting additional transverse rack members 67 in spaced relationship to the legs. Thus, as seen in FIGS. 1 and 2, a forward supplemental transverse member 67 may be provided at the forward end of the rack overlying the cab of the truck and a second supplemental transverse member 67 may be provided midway between the forward and rearward upright leg pairs at the opposite ends of the truck bed. Illustratively, such additional transverse members may be utilized to support short structures, such as pieces of pipe and the like, which may not extend fully between the transverse members 29 and 30 carried directly on the legs.

Thus, as seen in FIG. 7, connecting structure 66 differs from connecting structure 56 solely in the provision thereof independent of the leg structures so that the connecting structures 66 may be mounted to the side members 27 and 28 at any position along the length thereof spaced from the legs as desired.

By supporting the transverse rack members 29 and 30 on the upper ends of the upright legs through the respective socket means, a strong, positive support of the transverse rack members is provided. The connecting structures are positively clamped to the side members 27 and 28 so as to provide a rigid interconnection of the upright legs at their upper ends in the desired spaced relationship of the transverse rack members. However, as the connecting structures are releasably clamped to the side members, they may be readily adjusted to accommodate the rack structure to a wide range of truck bed lengths and sizes for facilitated installation and removal, as desired, without the need for custom forming of the rack structures.

As discussed above, the supplemental transverse rack members may be positioned anywhere along the lengths of the side members, as desired, and illustratively, one such transverse member may be provided at the forward end of the side members to provide the forwardmost transverse support thereof.

As the clamping association of each of the connecting structures is effected by removable bolt means, facilitated configuring of the rack structure to fit accurately the truck to which it is to be mounted may be readily effected while yet once installed thereon, the rack structure is effectively positively rigidly secured in place for improved rack use.

The foregoing disclosure of specific embodiments is illustrative of the broad inventive concepts comprehended by the invention.

We claim:

1. In a rack adapted to be mounted to a truck for providing an overlying support for ladders and the like, an improved upright support leg structure comprising an elongated upright defining a lower end adapted to be secured to the truck to project vertically upwardly therefrom, and an upper end construction adapted to support a pair of elongated horizontal support elements, said upper end construction comprising:
   a distal portion of the upright defining a horizontal support surface;
   a socket member having a lower inner end surface resting on said horizontal support surface, and an outer portion cantilevered therefrom defining a horizontally opening channel for receiving an end of one of the elongated horizontal support elements;
   an end plate closing an end of the socket member channel;
   means securing the end plate to the socket member and said distal upper end of the upright;
   retaining means removably associated with said end plate for defining with said end plate a through passage for extension of the other of the elongated horizontal support elements slidably therethrough; and
   means for selectively causing said retaining means to clamp the support element in said passage fixedly to said end plate in alignment with the support element in said socket member channel, said end plate having a portion facially abutting said upper end of the upright subjacent said support surface.

2. The truck rack structure of claim 1 wherein said socket member is U-shaped opening upwardly.

3. The truck rack structure of claim 1 wherein said socket member is tubular opening horizontally.

4. The truck rack structure of claim 1 including a means for securing an end of said one horizontal support element in said socket member, said securing means comprising an elongated element extending through said socket and support element end.

5. The rack structure of claim 1 wherein said end plate comprises a flat plate and said retaining means comprises a U-shaped plate having outturned flanges secured to said end plate.

* * * * *